Feb. 16, 1960 K. F. LANE 2,925,303
TRUCK BED CANOPY
Filed July 18, 1957

INVENTOR.
KEITH FRANKLIN LANE
BY
ATTORNEYS

United States Patent Office 2,925,303
Patented Feb. 16, 1960

2,925,303

TRUCK BED CANOPY

Keith Franklin Lane, Denver, Colo.

Application July 18, 1957, Serial No. 672,614

5 Claims. (Cl. 296—102)

This invention relates to truck bed enclosures and more particularly to truck bed enclosures for automobile-type pick-up trucks and to the method of installing the same on such trucks.

Recently, a streamlined, pick-up truck has been designed which very closely follows the general design of automobiles, i.e., having the appearance of a single seat automobile and utilizing a pick-up type bed integrally attached to the cab portion. This produces a truck which is substantially modeled after an automobile of the same class, weight and size. Such trucks are intended to serve as a passenger automobile; and, also, have the utility of pick-up trucks. For certain types of hauling, and especially in dry weather, these trucks are very usable. In wet weather, however, the usability of the trucks substantially decreases mainly due to the rather small bed with no covering. Applicant, therefore, has provided a removable closure for the truck which conforms closely to body lines of the vehicle and provides an economical, replaceable top for the truck bed.

Included among the objects and advantages of the present invention is to provide a removable top for an automobile-designed pick-up truck, which is arranged for quick and easy attachment and detachment from the truck body. The device of the invention includes snap fastener means for a canvas top over a light frame which is easily attached to the truck body. The top includes means for providing a substantially water-proof connection between the cab of the truck and the top.

These and other objects and advantages of the invention may be readily ascertained by referring to the following description and appended illustrations in which.

Figure 1:
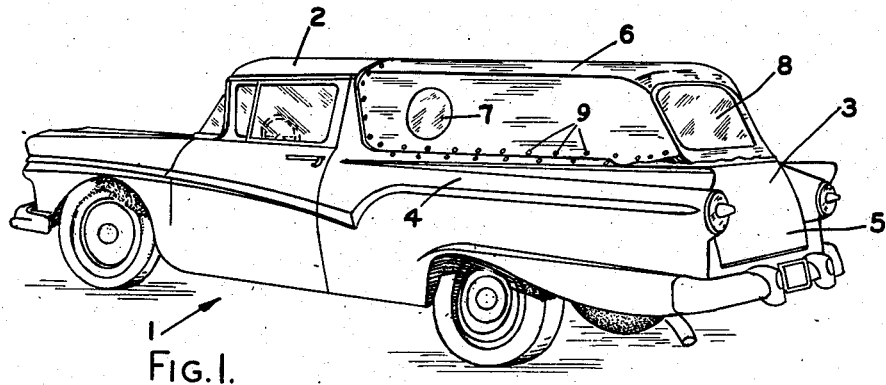
Fig. 1 is a perspective view of a truck having a top according to the invention assembled thereon.
Figure 3:
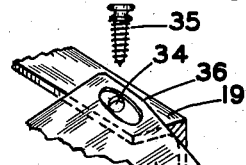
Fig. 3 is an enlarged detail of side panel portion of the frame and means for its attachment to the top part of the cab of the truck.

As illustrated in Fig. 1, a truck, designated in general by reference numeral 1, includes a cab 2 which is substantially a passenger automobile front seat and cab, and a truck body 3 integrally attached to the cab 2. The truck body includes side walls 4 and a tail gate 5. The truck includes normal equipment for driving, such as wheels, motor, not described in detail. A cover or top according to the invention and indicated by reference numeral 6 encloses the bed of the truck and is detachably secured to the cab and to the top of the side walls and tail gate as described below. For convenience, the top 6 includes a side window 7, and a back window 8 which is arranged for opening or complete detachment from the top and the body by means of snap fasteners, zippers, and the like. Preferably the panel is fastened by means of snap fasteners. The top is made of canvas which is attached by means of a series of snap fasteners 9 mounted adjacent the edge of the top and spaced at a short distance apart substantially all around the edge.

Figures 2, 4, 5:
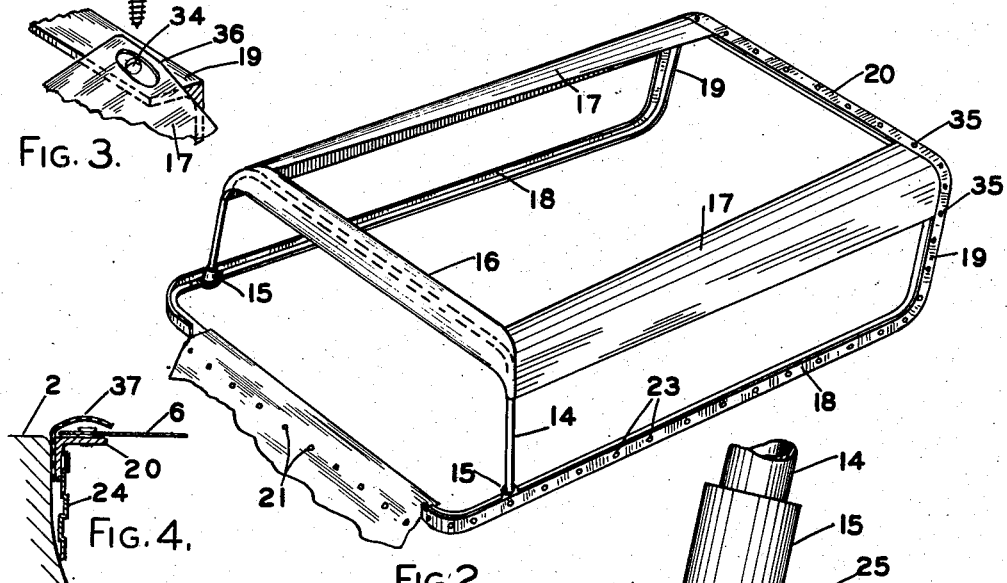
Fig. 2 is a perspective view of the frame members of the device of the invention.
Fig. 4 is a detailed enlargement of a frame portion attached to the truck cab illustrating the water-proof attachment means.
Fig. 5 is an enlarged detail of a fastening assembly of the frame members to the truck body in position for tightening.

The canvas top 6 is maintained in upright position above the truck bed by means of a frame, illustrated in Fig. 2. The frame for the canvas top 6 includes U-shaped rear post or bow 14 which is removably mounted in bow sockets 15 which are attached to the body. A shaping cover 16 is securely fastened to the bow 14 and provides a rounded corner for shaping the canvas top. A pair of shaped side panels 17 extend from the rear bow 14 to the front of the frame. These side members 17, are, likewise, curved to provide a large radius, corner mount for the canvas. The panels 17 and the cover 16 are preferably made of sheet metal, shaped to provide a smoothly curved corner for the canvas top which prevents tearing the canvas and conforms it to the shape of the truck cab. This also aids in the stretching of the canvas which is draped over the frame.

Figure 6:
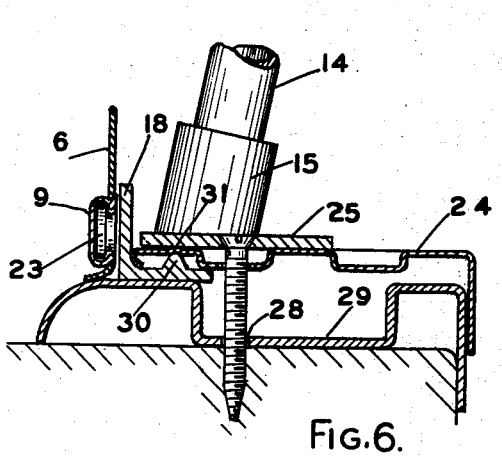
Fig. 6 is an enlarged detail of the fastening assembly in tight engagement with the truck body.

The bottom sides 18 of the frame are metal angles which are curved at the ends to fit the truck body and to which are attached one-half of a plurality of snap fasteners 23. The snap fasteners may be attached by riveting, welding, etc. The angles 18 are arranged to be attached directly to the truck bed or placed under a chrome strip 24 which is original equipment on some trucks and extends completely around the top edge of the bed of the truck and around the cab thereof. As illustrated in Fig. 5, the chrome strip 24 is loosened and the angle 18 is placed thereunder. The bow socket 15 which is welded or otherwise attached to a base plate 25 and metal screws 26 passes through holes 27 and provides means for attachment to the truck. The chrome is fastened to the body by means of strip holes 28 in the body portion 29, and by pulling down on the screws 26 the molding or chrome strip 24 is pulled down tight onto the angle 18, completing the assembly. Fig. 5 illustrates the assembly with the screw 26 in position to pull molding 24 down on to the angle 18, and Fig. 6 illustrates the assembly tightened into place. A plurality of projections 30 spaced along the horizontal flange of the angle, are arranged to force a small dent 31 in the molding 24 when pulled tight by the holding screws, so that the angle 18 is securely held in place. The projections 30 may be formed as dimples in one leg of the angle 18. The molding or chrome strip comes as standard equipment on some trucks, and by merely loosening the screws which hold the molding down, the angle 18 may be placed along both sides and the angles 19 on the cab uprights, as indicated. The front part of panels 17 are held to the upright angles 19 by means of screws 35. The panel has an elongated hole 36 so as to provide easy fitting to the truck. A hole 34 in the angle 19 permits the screw to be passed through the elongated hole and into the angle 19. The angle 20 is fastened to the top of the cab by loosening the molding 24 and placing the angle under it. The tail gate is provided with snap fasteners 21 for holding the bottom of the panel 8. Snap fasteners 9 in the canvas coact with fasteners 23 in the angles to provide means for attaching the canvas.

The canvas 6 is secured to the snap fasteners in angle 20 at the top thereof, and a rubber flap 37 is mounted between the angle 20 and the body 2 to provide a rain shield. The flap 37 extends over the junction between the canvas and the body to prevent wind and water from passing between the canvas and the angle. The flap is easily lifted to expose the fasteners.

For installing the frame of the cover of the invention, the chrome trim strip 24 which extends completely around the body is loosened. The strip on the tail gate is not loosened as threaded snap fasteners 21 are secured therein. The angles 18, 19 and 20 are placed between the trim and the body, and the holding screws of the trim are then retightened to hold the angle in position under a chrome strip. The bow-socket 15 is secured to the rear of the truck bed, and the rear bow is mounted therein. The rear bow is installed in the sockets 15 with set screws if desired, and the side panels 17 are secured in the bow and the cab angles 19 and 20 by means of the snap fastener screws 35. Since there is generally a slight variation in the truck bodies, the front end of the side panels 17 should be installed before the bow socket is positioned for installation. This provides correct positioning for the socket for each. With all the chrome strips pulled down by the holding screws, and with the bow socket in place on the truck bed, the canvas top 6 is placed over the frame and snapped into position all along the side and the front. The front of the top next to the cab is placed in position by pulling up the rubber hood or flap 37 and snapping the fasteners onto the snaps on the angle 20. With the top in place, the back panel 8 is fastened in position, and the snap fasteners 21 may be used to secure the bottom of the back panel onto the tail gate.

While the attachment cover of the invention has been illustrated by the use of the angles with a part of snap fasteners attached thereto, it is obvious that the snap fasteners may be attached directly to the truck, as by snap fastener screws 35, but in the preferred method using the chrome strip, no additional holes have to be made in the truck body except for the tail gate. Since this type of truck is generally supplied with the chrome strip around the top edge of the truck bed, the angle holding the snap fasteners provides an economical and easy method of holding the cloth cover. Further, if it is desired to completely dismantle the top from the truck, the angles may be readily removed and the strip retightened without leaving additional holes in the body.

While the invention has been illustrated with reference to a particular device, there is no intent to limit the spirit or the scope of the invention to the precise details so set forth except insofar as limited in the following claims.

I claim:

1. In a removable top for a vehicle with a cab having an integral truck bed and a molding extending around the periphery of the bed portion and the rear of the cab, a pair of socket members arranged to seat on the molding on opposite sides of a rear portion of the truck bed and be secured to the truck body, a bow removably mounted in said socket members spanning the rear end of the bed of the truck and having a portion above the truck bed, a pair of panels extending from opposed and upper positions on said bow to opposed and upper portions on the truck cab, said panels providing an upper large radius corner at about maximum width of the truck bed, a plurality of angles having one side thereof positioned between the truck body and the molding and the other side thereof extending substantially perpendicular to the truck portion to which it is attached, said angles extending substantially around the peripheral edge of the truck bed and rear portion of the cab, a plurality of spaced snap fasteners mounted in the other side of said angles and extending therearound, a rubber hood secured between the molding and the top of the cab and encompassing the adjacent angle and attached snap fasteners, a canvas cover stretched over the panels and bow, and snap fasteners adjacent the edge of the cover cooperative with the snap fasteners in the angles for removably securing the cover to the truck bed.

2. In a removable top for a vehicle with a cab having an integral truck bed and a molding extending around the periphery of the bed portion and the rear of the cab, a pair of socket members removably fastened on the molding on opposite sides of a rear portion of the truck bed, a bow having its ends removably mounted in said socket members and arched above the bed of the truck substantially the same height as the cab, a pair of sheet metal panels extending from opposed and upper positions on said bow to opposed and upper portions on the truck cab, said panels providing an upper large radius corner at about maximum width of the truck bed, a plurality of angles having one side thereof secured between the truck body and the molding and the other side extending thereabove, said angles extending substantially around the peripheral edge of the truck bed, said panels being removably secured to said angle at said cab, a plurality of spaced snap fasteners mounted on the upwardly extending portion of said angles and continuous therearound, a rubber hood secured between the molding and the top of the cab and encompassing the adjacent angle and attached snap fasteners, a canvas cover stretched over the panels and bow, and snap fasteners adjacent the edge of the cover cooperative with the snap fasteners in the angles for removably securing the cover to the truck.

3. In a removable top for a vehicle of the class described which has an integral truck bed and a molding extending around the periphery of the truck bed portion, a frame for supporting a canvas top, an angle member having a plurality of projections on one flange positioned between the molding and truck body for securely holding the angle therebetween and positioning the other flange upwardly from the molding when said molding is pulled tight onto said angle to thereby dent the molding by each said projection, a canvas top having a plurality of snap fasteners spacedly mounted adjacent the edge thereof stretched over said frame, and a plurality of snap fasteners mounted in the upwardly extending flange of said angle member cooperative with the snap fasteners in said top for removably securing the same on said frame.

4. In a removable top for a vehicle of the class described which has an integral truck bed and a molding extending around the periphery of the truck bed portion, a frame removably attached to the truck bed inclusive of side supports, an angle member having a plurality of projections on one flange positioned between the molding and the truck, said projections being positioned to dent said molding when pulled onto said angle for securely holding the angle in place, a canvas cover having a plurality of snap fasteners spacedly fixed in the edge thereof stretched over said frame enclosing said truck bed, and a plurality of spaced snap fasteners secured to the upwardly extending leg of said angle and cooperative with the snap fasteners in said cover for removably securing the same to said angle.

5. In a removable top for a vehicle of the class described which has an integral truck bed and a molding extending around the periphery of the truck bed portion, a frame removably attached to the truck bed inclusive of upper side supports, an angle member having a plurality of spaced, conical projections on one flange positioned between the molding and the truck, said projections being positioned to dent said molding when pulled onto said angle for securely holding the angle in place, a canvas cover having a plurality of snap fasteners spacedly fixed in the edge thereof stretched over said frame enclosing said truck bed, and a plurality of snap fasteners secured to the upwardly extending leg of said angle and cooperative with the snap fasteners in said cover for removably securing the same to said angle.

(References on following page)

References Cited in the file of this patent

UNITED STATES PATENTS

| | | |
|---|---|---|
| 1,373,207 | Shaw | Mar. 29, 1921 |
| 1,490,491 | Smothers | Apr. 15, 1924 |
| 2,434,711 | Mobbs | Jan. 20, 1948 |
| 2,846,262 | Ray | Aug. 5, 1958 |

FOREIGN PATENTS

| | | |
|---|---|---|
| 155,461 | Australia | Feb. 26, 1954 |
| 300,485 | Great Britain | Nov. 15, 1938 |
| 89,894 | Switzerland | July 16, 1921 |